United States Patent
Kim et al.

(10) Patent No.: US 10,177,351 B2
(45) Date of Patent: Jan. 8, 2019

(54) RECHARGEABLE BATTERY

(71) Applicant: SAMSUNG SDI CO., LTD., Yongin-si, Gyeonggi-do (KR)

(72) Inventors: Kwonchul Kim, Yongin-si (KR); Jeawoan Lee, Yongin-si (KR); Youngchang Lim, Yongin-si (KR); Soomi Eo, Yongin-si (KR); Kyung Kim, Yongin-si (KR); Jaemin Lim, Yongin-si (KR); Seunghee Park, Yongin-si (KR); Euysun Jung, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 227 days.

(21) Appl. No.: 15/350,136

(22) Filed: Nov. 14, 2016

(65) Prior Publication Data
US 2017/0141363 A1    May 18, 2017

(30) Foreign Application Priority Data
Nov. 17, 2015 (KR) .................. 10-2015-0160908

(51) Int. Cl.
| H01M 2/06 | (2006.01) |
|---|---|
| H01M 2/10 | (2006.01) |
| H01M 2/26 | (2006.01) |
| H01M 2/02 | (2006.01) |
| H01M 2/30 | (2006.01) |

(52) U.S. Cl.
CPC ........... *H01M 2/06* (2013.01); *H01M 2/0212* (2013.01); *H01M 2/26* (2013.01); *H01M 2/30* (2013.01)

(58) Field of Classification Search
CPC combination set(s) only.
See application file for complete search history.

(56) References Cited

U.S. PATENT DOCUMENTS

| 8,551,646 B2* | 10/2013 | Choi ................... H01M 2/0426 429/178 |
|---|---|---|
| 2008/0096101 A1* | 4/2008 | Kwag ................. H01M 2/0207 429/121 |
| 2011/0117399 A1* | 5/2011 | Ahn ..................... H01M 2/021 429/57 |

(Continued)

FOREIGN PATENT DOCUMENTS

| KR | 10-2006-0028170 A | 3/2006 |
|---|---|---|
| KR | 10-2007-0104689 A | 10/2007 |

(Continued)

*Primary Examiner* — Kaity V Chandler
(74) *Attorney, Agent, or Firm* — Lee & Morse, P.C.

(57) ABSTRACT

A rechargeable battery includes an electrode assembly, a pouch accommodating the electrode assembly, a first electrode tab electrically connected to the electrode assembly, the first electrode tab including a protruding portion that protrudes outwardly from a first surface of the electrode assembly so as to be exposed to the outside of the pouch and a parallel portion that extends along the first surface of the electrode assembly, and a fixing tape that attaches and fixes the first electrode tab to the first surface of the electrode assembly. The fixing tape adheres to cover the parallel portion of the first electrode tab bent along the first surface of the electrode assembly and the first surface of the electrode assembly.

11 Claims, 6 Drawing Sheets

(56) References Cited

U.S. PATENT DOCUMENTS

2011/0287302 A1* 11/2011 Kim .................. H01M 2/022
                                                    429/163
2015/0072204 A1*  3/2015 Kwon ................ H01M 2/26
                                                     429/94
2016/0218347 A1*  7/2016 Baek ................. H01M 2/348

FOREIGN PATENT DOCUMENTS

KR    10-2008-0047637 A     5/2008
KR    10-2011-0137905 A    12/2011

* cited by examiner

RECHARGEABLE BATTERY

CROSS-REFERENCE TO RELATED APPLICATION

Korean Patent Application No. 10-2015-0160908, filed on Nov. 17, 2015, in the Korean Intellectual Property Office, and entitled: "Rechargeable Battery," is incorporated by reference herein in its entirety.

BACKGROUND

1. Field

Embodiments relate to a rechargeable battery.

2. Description of the Related Art

A rechargeable battery is a battery that can be repeatedly charged and discharged, unlike a primary battery. A small-capacity rechargeable battery having a single pack electrode assembly packaged in the form of a pack is used for small portable electronic devices such as mobile phones, camcorders, and the like, while a large-capacity rechargeable battery having several tens of electrode assemblies connected to each other is widely used as a motor-driving power source, such as in an electric scooter, a hybrid vehicle, or an electric vehicle, or as a large-capacity power storage device. Rechargeable batteries may be manufactured as different types.

SUMMARY

Embodiments are directed to a rechargeable battery including an electrode assembly, a pouch accommodating the electrode assembly, a first electrode tab electrically connected to the electrode assembly, the first electrode tab including a protruding portion that protrudes outwardly from a first surface of the electrode assembly so as to be exposed to the outside of the pouch and a parallel portion that extends along the first surface of the electrode assembly, and a fixing tape that attaches and fixes the first electrode tab to the first surface of the electrode assembly. The fixing tape adheres to cover the parallel portion of the first electrode tab bent along the first surface of the electrode assembly and the first surface of the electrode assembly.

The first electrode tab may include a first base member tab connected to the electrode assembly, a first external tab having an external tab welding part welded to the first base member tab, and an external tab extension part extending from the external tab welding part and exposed to the outside of the pouch.

A thickness of the first base member tab may be less than that of the first external tab. The thickness of the first base member tab may be in a range of 20 μm to 40 μm. The thickness of the first external tab may be in a range of 0.1 mm to 0.2 mm.

The first base member tab may be an extension of a first electrode uncoated portion, the first electrode uncoated portion being a portion of a first electrode plate of the electrode assembly where an active material is not coated.

The first base member tab may include a connecting part, a base member tab bending part, and a base member welding part. The connecting part may be connected to the electrode assembly. The base member welding part may be parallel with the first surface of the electrode assembly. The first base member tab may be welded to the external tab welding part of the first external tab at the base member welding part, such that the base member welding part and the external tab welding part form the parallel portion of the first electrode tab. The base member tab bending part may be between the connecting part and the base member welding part.

The first external tab may include the external tab bending part between the external tab welding part parallel to the first surface of the electrode assembly, and the external tab extension part perpendicular to the first surface of the electrode assembly.

The rechargeable battery may further include an insulating tape between the parallel portion of the first electrode tab bent along the first surface of the electrode assembly and the first surface of the electrode assembly.

A length of the insulating tape in a lengthwise direction of the first surface of the electrode assembly may be less than a length of the fixing tape in the lengthwise direction.

The fixing tape may be adhered in a lengthwise direction of the first surface of the electrode assembly so as to cover the first electrode tab and may extend and bend in the lengthwise direction of the first surface of the electrode assembly so as to cover portions of opposite short side surfaces of the electrode assembly.

The fixing tape may be adhered in a lengthwise direction of the first surface of the electrode assembly so as to cover the first electrode tab and may extend and bend to be perpendicular to the lengthwise direction of the first surface of the electrode assembly so as to cover a portion of one long side surface of the electrode assembly.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1A:
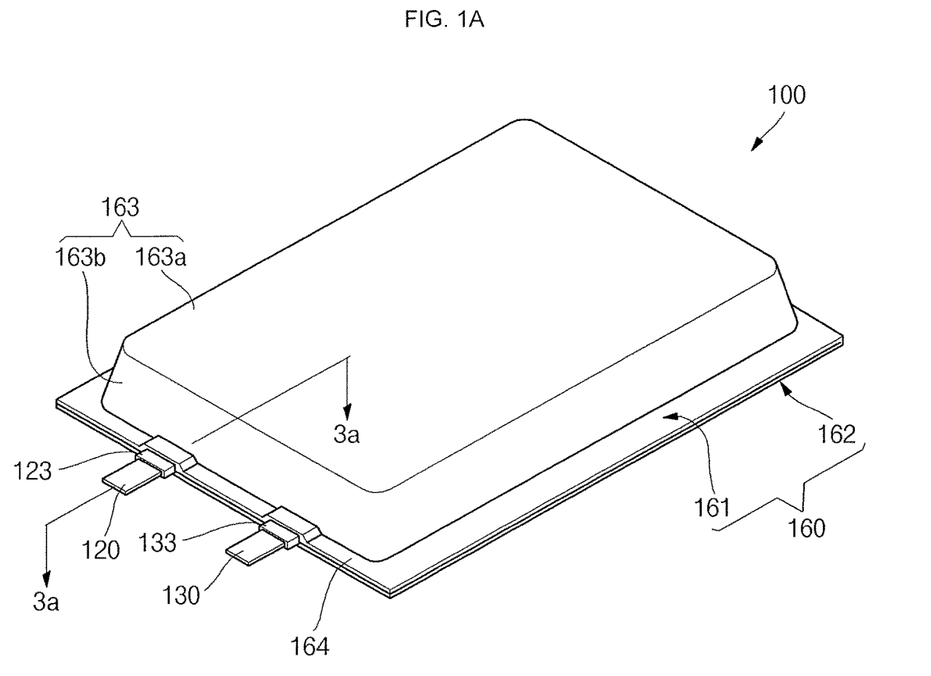
FIGS. 1A and 1B illustrate a perspective view and an exploded perspective view, respectively, of a rechargeable battery according to an embodiment.
Figure 1B:
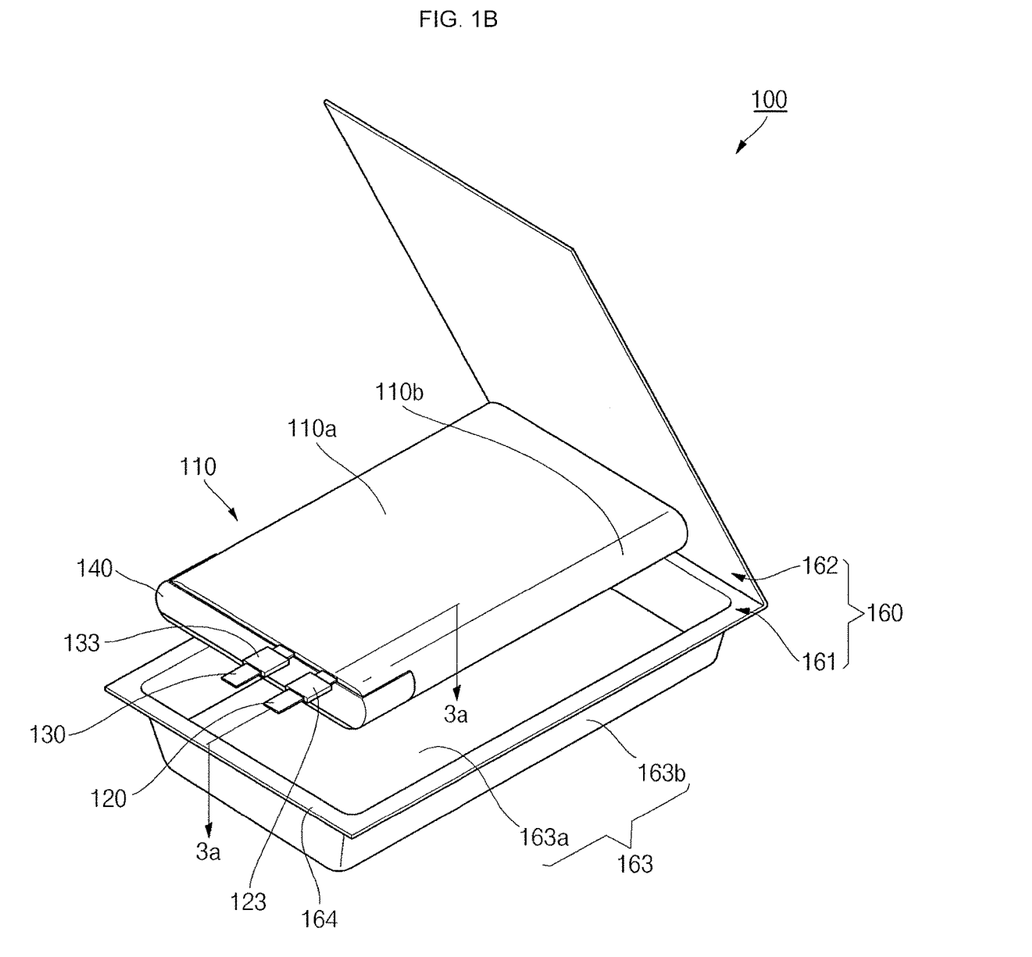

Referring to FIG. 1A, a perspective of a rechargeable battery according to an embodiment is illustrated. Referring to FIG. 1B, an exploded perspective view of the rechargeable battery of FIG. 1A is illustrated.

As illustrated in FIGS. 1A and 1B, the rechargeable battery 100 may include an electrode assembly 110, a first electrode tab 120, a second electrode tab 130, a fixing tape 140, and a pouch 160. The rechargeable battery 100 may further include an insulating tape 150 interposed between the electrode assembly 110 and the electrode tabs 120 and 130. (See FIG. 2A through FIG. 4.) The pouch 160 may include a pouch body 161 in which the electrode assembly 110 is accommodated and a pouch cover 162 combined with the pouch body 161.

Figure 2A:
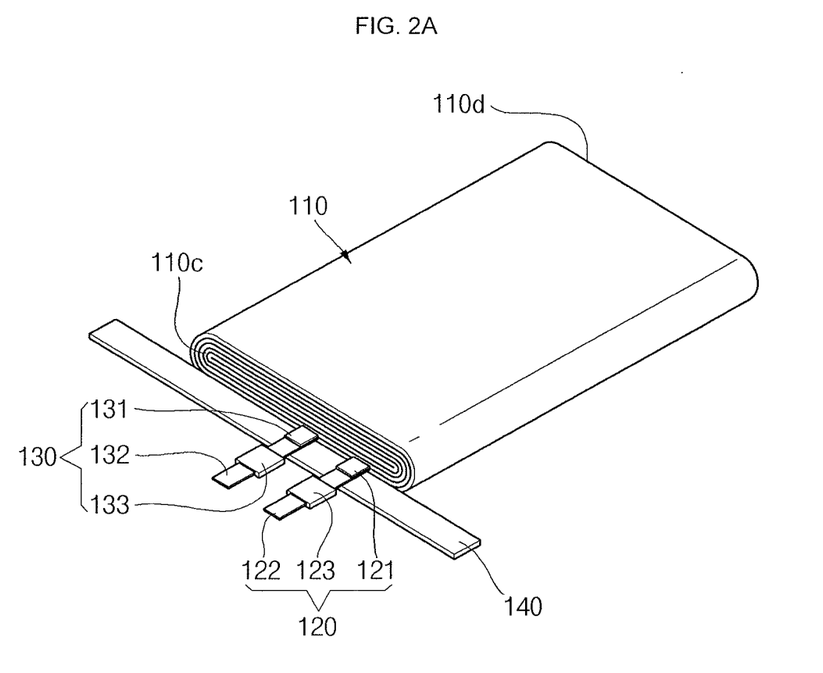
FIG. 2A illustrates a perspective view depicting the relationship between electrode tabs of the rechargeable battery illustrated in FIG. 1B and a fixing tape.
Figure 2B:
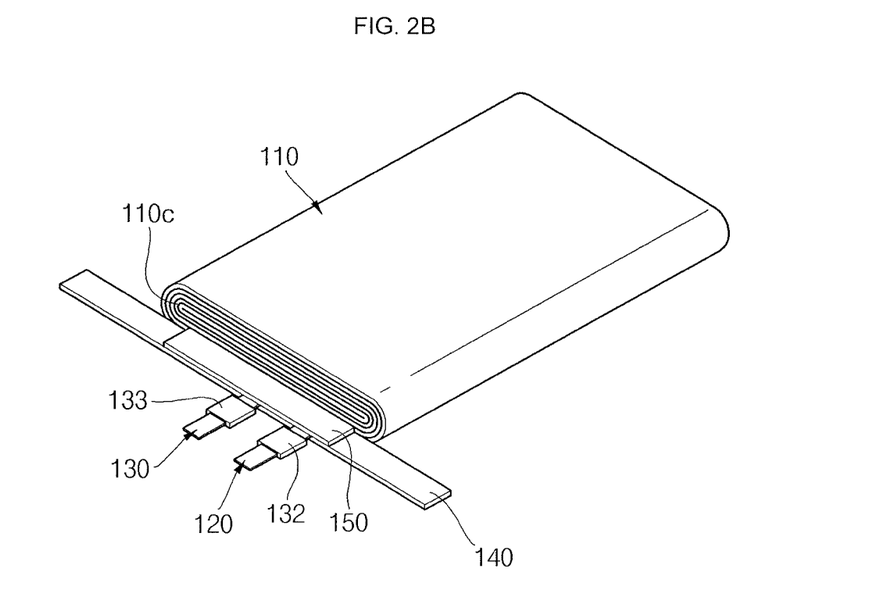
FIG. 2B illustrates an exploded perspective view depicting a structure having an insulating tape attached to the electrode tabs.
Figure 3A:
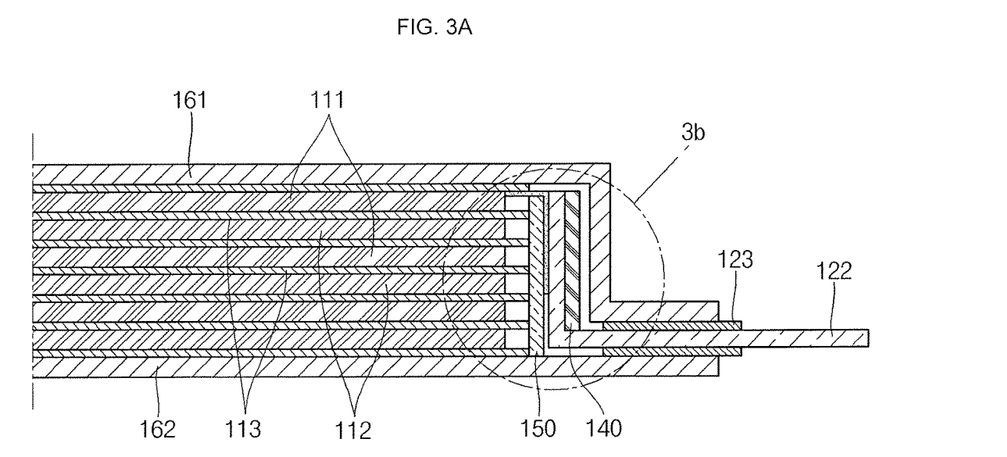
FIGS. 3A and 3B illustrate a cross-sectional view and an enlarged view, respectively, taken along the line 3a-3a of FIG. 1A.
Figure 3B:
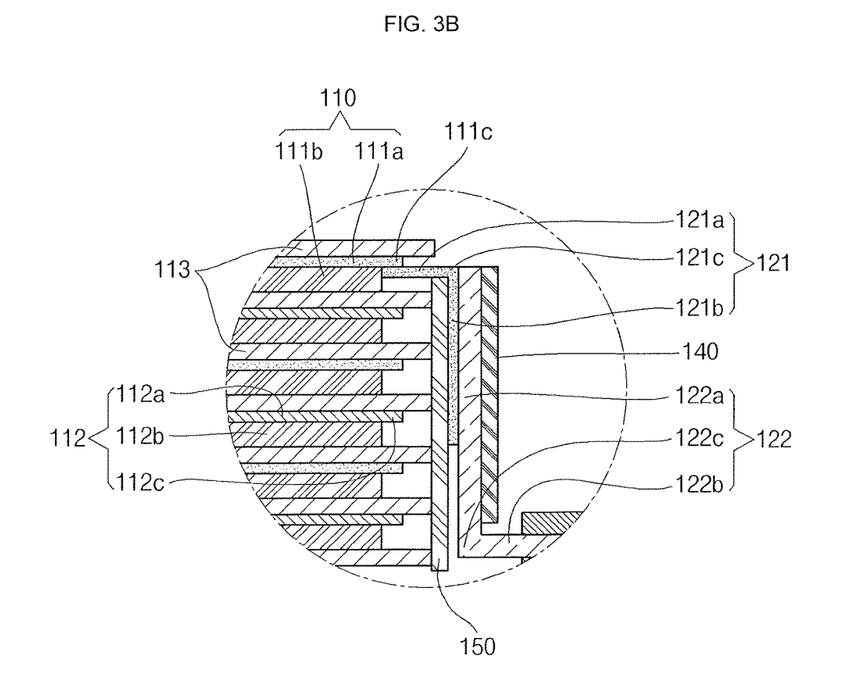

FIG. 1A illustrates a perspective view of the rechargeable battery 100 viewed toward the pouch body 161 of the pouch 160 and FIG. 1B illustrates an exploded perspective view of the rechargeable battery 100 viewed toward the pouch cover 162 of the pouch 160, which is opposite to the direction in which the rechargeable battery 100 viewed toward the pouch body 161 in FIG. 1A. FIG. 2A illustrates a perspective view depicting the relationship between electrode tabs 120 and 130 and the fixing tape 140 in the electrode assembly 110 of the rechargeable battery 100 illustrated in FIG. 1B. FIG. 2B illustrates an exploded perspective view depicting a structure having the insulating tape 150 attached to the electrode tabs 120 and 130 of the electrode assembly 110 of FIG. 2A. FIGS. 3A and 3B illustrate a cross-sectional view and an enlarged view, respectively, taken along the line 3a-3a of FIG. 1A.

Hereinafter, a configuration of the rechargeable battery 100 will be described with reference to FIGS. 1A, 1B, 2A, 2B, 3A and 3B.

The electrode assembly 110 may be formed by spirally winding or laminating a stacked structure including a first electrode plate 111, a separator 113, and a second electrode plate 112, which may be thin plates or films. In FIGS. 2A and 2B, the electrode assembly 110 of the rechargeable battery 100 is shown as having a wound jelly-roll configuration, but in other implementations, the electrode assembly 110 may have other configurations, such as a stacked structure. The first electrode plate 111 may serve as a positive electrode and the second electrode plate 112 may serve as a negative electrode, or vice versa. The electrode assembly 110 is accommodated in the pouch 160.

As illustrated in FIGS. 3A and 3B, the first electrode plate 111 may be formed by coating a first electrode active material 111b, such as, for example, graphite or carbon, on a first electrode collector plate 111a made of a metal foil, such as, for example, an aluminum foil. The first electrode plate 111 may include a first electrode uncoated portion 111c on which the first electrode active material 111b is not coated. The first electrode uncoated portion 111c may provide a current flow path between the first electrode plate 111 and the outside of the first electrode plate 111.

The second electrode plate 112 may be formed by coating a second electrode active material 112b, such as, for example a transition metal oxide, on a second electrode collector plate 112a made of, for example, a metal foil, such as a copper or nickel foil. The second electrode plate may include a second electrode uncoated portion 112c on which the second electrode active material 112b is not coated. The second electrode uncoated portion 112c may provide a current flow path between the second electrode plate 112 and the outside of the second electrode plate 112.

The separator 113, positioned between the first and second electrodes 111 and 112, may prevent or substantially prevent an electrical short-circuit therebetween and may allow movement of transition metal ions. The separator 113 may be made of polyethylene, polypropylene, or a composite film of polyethylene and polypropylene, as examples.

The first and second electrode plates 111 and 112 of the electrode assembly 110 may be electrically connected to the first electrode tab 120 and the second electrode tab 130, respectively. The electrode assembly 110 may have two planar long side surfaces 110a facing each other and two short side surfaces 110b connecting the two long side surfaces 110a. The two short side surfaces 110b may be curved surfaces formed by winding the electrode assembly 110. The electrode assembly 110 may have a first surface 110c to which the first electrode tab 120 and the second electrode tab 130 are connected. and the first surface 110c may extend perpendicular to the two long side surfaces 110a and the two short side surfaces 110b. The electrode assembly may include a second surface 110d on an opposite side of the electrode assembly 110 from the first surface 110c.

The first electrode tab 120 may be electrically connected to the first electrode plate 111 of the electrode assembly 110. The first electrode tab 120 may include a plate-shaped first base member tab 121 electrically connected to the first electrode plate 111 of the electrode assembly 110, and a plate-shaped first external tab 122 electrically connected to the first base member tab 121 and having a portion exposed to the outside of the pouch 160. The first external tab 122 of the first electrode tab 120 may extend and protrude to the outside through a planar part 164 of the pouch 160. The first electrode tab 120 may further include a first protecting tape 123 provided inside the planar part 164 so as to surround the first external tab 122. The first protecting tape 123 may be made of an insulating material to help prevent an electrical short between the pouch 160 and the first electrode tab 120. The first electrode tab 120 may be made of aluminum or an aluminum alloy, as examples.

As shown in FIG. 3B, first base member tab 121 may include a connecting part 121a connected to the first electrode plate 111 of the electrode assembly 110, a welding part 121b parallel with the first surface 110a of the electrode assembly 110 and welded to the first external tab 122, and a base member tab bending part 121c provided between the connecting part 121a and the welding part 121b. The connecting part 121a of the first base member tab 121 may be welded to one surface of the first electrode plate 111 and may be perpendicular to the first surface 110a of the electrode assembly 110. The connecting part 121a of the first base member tab 121 may be welded to the first electrode uncoated portion 111c, corresponding to a region of the first electrode plate 111 on which an active material is not coated. The base member tab bending part 121c may be bent 90 degrees. After the welding part 121b of the first base member tab 121 and the welding part 122a of the first external tab 122 are welded to each other, the base member tab bending part 121c may be in a bent state when the first base member tab 121 and the first external tab 122 are attached and fixed to the first surface 110c of the electrode assembly 110 by the fixing tape 140.

The first external tab 122 may include a welding part 122a welded to the first base member tab 121, an extension part 122b that extends perpendicular to the first surface 110c of the electrode assembly 110 and that has a portion exposed to the outside of the pouch 160, and an external tab bending part 122c provided between the welding part 122a and the extension part 122b. The external tab bending part 122c may be bent 90 degrees. After the welding part 121b of the first base member tab 121 and the welding part 122a of the first external tab 122 are welded to each other, the external tab bending part 122c may be in a bent state after when the first base member tab 121 and the first external tab 122 are adhered and fixed to the first surface 110c of the electrode assembly 110 by the fixing tape 140.

A thickness of the first base member tab 121 may be less than that of the first external tab 122. When the first base member tab 121 is provided as thin film. A dispersion condition in which a portion welded to the first electrode plate 111 of the electrode assembly 110 protrudes compared to a non-welded portion may be reduced. As examples, the first base member tab 121 may have a thickness in a range of 20 μm to 40 μm, and the first external tab 122 may have a thickness in a range of 0.1 mm to 0.2 mm.

Figure 4:
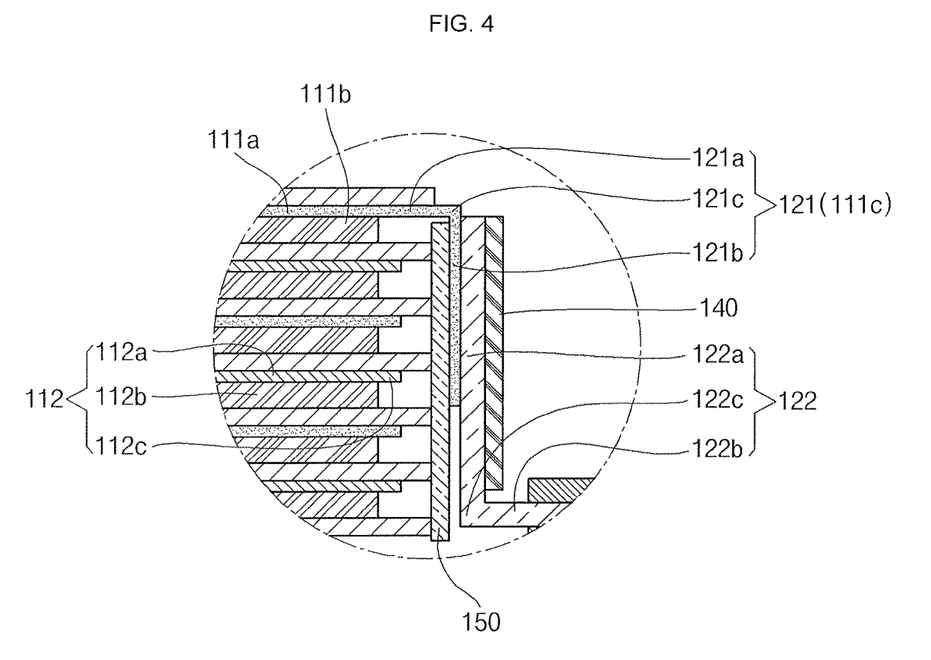
FIG. 4 illustrates an enlarged cross-sectional view depicting another example of a portion 3b of FIG. 3A.

As illustrated in FIG. 4, in an implementation, the first base member tab 121 may be an extension of the first electrode uncoated portion 111c of the first electrode plate 111, instead of a separate component. The first electrode uncoated portion 111c may protrude and extend farther than the separator 113 toward the first surface 110c of the electrode assembly 110. When the first base member tab 121 is formed as an extension of the first electrode uncoated portion 111c of the first electrode plate 111, it may be possible to prevent a protruded portion and the dispersion condition from occurring when the first electrode tab 120 is welded to the first electrode plate 111.

The second electrode tab 130 may be electrically connected to the second electrode plate 112 of the electrode assembly 110. The second electrode tab 130 may include a plate-shaped second base member tab 131 electrically connected to the second electrode plate 112 of the electrode assembly 110, and a plate-shaped second external tab 132 electrically connected to the second base member tab 131, the plate-shaped second external tab 132 having a portion exposed to the outside of the pouch 160. The second external tab 132 of the second electrode tab 130 may extend and protrude to the outside through the planar part 164 of the pouch 160. The second electrode tab 130 may further include a second protecting tape 133 provided inside the planar part 164 so as to surround the second external tab 132. The second protecting tape 133 may be made of an insulating material to prevent an electric short between the pouch 160 and the second electrode tab 130. The second electrode tab 130 may be substantially the same as the first electrode tab 120 in view of configuration and shape.

The first electrode tab 120 and the second electrode tab 130 may protrude and extend to the outside of the pouch 160 through the planar part 164 formed in front of the pouch 160, and may be parallel with each other.

The fixing tape 140 may bend the first electrode tab 120 and the second electrode tab 130 to be parallel with the first surface 110c of the electrode assembly 110, thereby fixing the bent first and second electrode tabs 120 and 130 to the first surface 110c of the electrode assembly 110. The fixing tape 140 may extend along the lengthwise direction of the first surface 110c of the electrode assembly 110 and may be bent to be adhered to the opposite short side surfaces 110b of the electrode assembly 110. When the fixing tape 140 is adhered to the first surface 110c of the electrode assembly 110 and is bent to then be adhered to the opposite short side surfaces 110b, the first electrode tab 120 and the second electrode tab 130 may be tightly fixed to the first surface 110c of the electrode assembly 110.

The fixing tape 140 may be made of a suitable insulating material such as a polyimide tape, as an example.

As illustrated in FIG. 2A, in a state in which the fixing tape 140 is adhered to one surface of each of the electrode tabs 120 and 130, the fixing tape 140 may be adhered to the first surface 110c of the electrode assembly 110 while the electrode tabs 120 and 130 are bent 90 degrees so as to be parallel with the first surface 110c of the electrode assembly 110. In order to insulate the electrode tabs 120 and 130 from the first surface 110c of the electrode assembly 110, the insulating tape 150 may further be adhered to the other surface of each of the electrode tabs 120 and 130. As illustrated in FIG. 2B, the fixing tape 140 may be adhered to one surface of each of the electrode tabs 120 and 130 and the insulating tape 150 may be adhered to the other surface of each of the electrode tabs 120 and 130. The fixing tape 140 and the electrode tabs 120 and 130 may be bent 90 degrees to be parallel with and to adhere to the first surface 110c of the electrode assembly 110. After the fixing tape 140 is adhered to the first surface 110c of the electrode assembly 110, opposite ends of the fixing tape 140 may be bent to then be adhered to the opposite short side surfaces 110b of the electrode assembly 110.

The insulating tape 150 may be adhered to entirely cover the other surfaces of each of the electrode tabs 120 and 130. A length of the insulating tape 150 may be shorter than a length of the fixing tape 140 and a length of the first surface 110c of the electrode assembly 110. The terms "length of the fixing tape 140" and "length of the insulating tape 150" may refer to lengths of the fixing tape 140 and the insulating tape 150 extended along the lengthwise direction of the electrode assembly 110.

When the fixing tape 140 is adhered to the first surface 110c of the electrode assembly 110, the insulating tape 150 is interposed between each of the electrode tabs 120 and 130 and the first surface 110c of the electrode assembly 110, thereby insulating the electrode tabs 120 and 130 from the electrode assembly 110.

The welding parts where the first base member tab 121 of the first electrode tab 120 is welded to the first external tab 122 and the welding part where the second base member tab 131 of the second electrode tab 130 is welded to the second external tab 132 may be located between the fixing tape 140 and the insulating tape 150.

The pouch 160 may include the pouch body 161 and the pouch cover 162, which may be folded in a lengthwise direction of one side of a generally integrally formed rectangular pouch layer.

The pouch body 161 may include an accommodation unit 163, which may be a groove that accommodates the electrode assembly 110. The accommodation unit 163 may be formed by performing a pressing process on the rectangular pouch layer by applying a pressure to the rectangular pouch layer using a mold shaped to correspond to the accommodation unit 163. The accommodation unit 163 may include a bottom portion 163a that is in a form of a planar plate, and a side portion 163b that is formed as a single body extending a predetermined height from four corners of the bottom portion 163a so as to be perpendicular to the bottom portion 163a. The accommodation unit 163 may be shaped to have one open side of a hexahedron facing the bottom portion 163a.

In addition, the pouch body 161 may further include the planar portion 164 bent from an end of the side portion 163b and extending outwardly along the edge of the accommodation unit 163 so as to be parallel with the bottom portion 163a.

The pouch body 161 may be a multi-layered thin film including a metal thin film and insulation layers formed on one surface and the other surface of the metal thin film. Like the pouch body 161, the pouch cover 162 may also have a multi-layered structure.

As described above, according to the rechargeable battery 100, the first electrode tab 120 and the second electrode tab 130 may be tightly fixed to three surfaces of the electrode assembly 110 at right angles using the fixing tape 140.

Accordingly, it may be possible to prevent the first electrode tab 120 and the second electrode tab 130 from being separated or from protruding from the electrode assembly 110 to be electrically shorted with the pouch 160. In addition, in the rechargeable battery 100, when the first electrode tab 120 and the second electrode tab 130 are fixed to the first surface 110c of the electrode assembly 110 at right angles, internal space utilization efficiency of the accommodation unit 163 in the pouch 160 may be increased, and the capacity of the electrode assembly 110 accommodated in the accommodation unit 163 may be increased.

Figure 5:
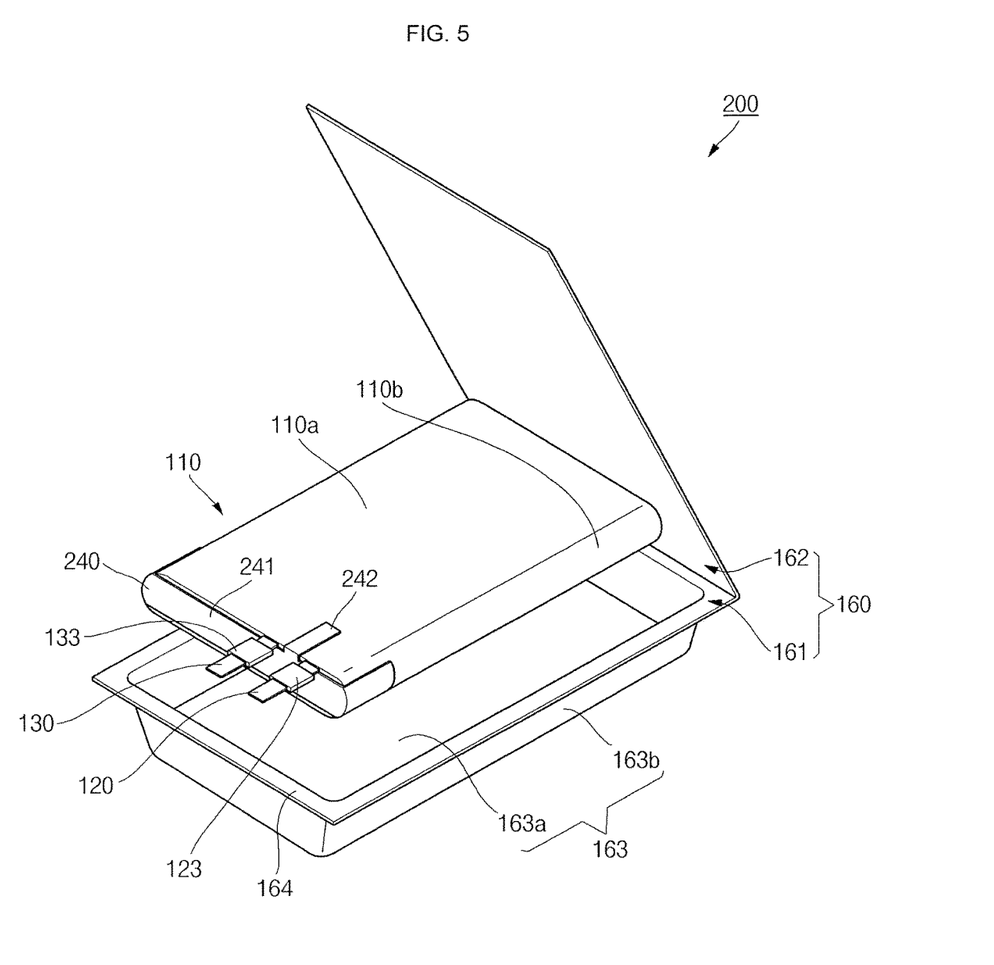
FIG. 5 illustrates an exploded perspective view of a rechargeable battery according to an embodiment.

Referring to FIG. 5, an exploded perspective view of a rechargeable battery according to an embodiment is illustrated.

As illustrated in FIG. 5, the rechargeable battery 200 includes an electrode assembly 110, a first electrode tab 120, a second electrode tab 130, a fixing tape 240 and a pouch 160. In addition, the rechargeable battery 100 may further include an insulating tape 150 interposed between the electrode assembly 110 and the electrode tabs 120 and 130. The pouch 160 may include a pouch body 161 in which the electrode assembly 110 is accommodated and a pouch cover 162 combined with the pouch body 161.

The electrode assembly 110, the first electrode tab 120, the second electrode tab 130, the insulating tape 150 and the pouch 160 of the rechargeable battery 200 may be the same as the corresponding functional components of the rechargeable battery 100 illustrated in FIGS. 1A, 1B, 2A, 2B, 3A and 3B. Therefore, the following description of the rechargeable battery 200 will focus on the fixing tape 240, which is a different feature of the rechargeable battery 100.

The fixing tape 240 may bend the first electrode tab 120 and the second electrode tab 130 to be parallel with the first surface 110c of the electrode assembly 110 and may fix the bent first and second electrode tabs 120 and 130 to the first surface 110c of the electrode assembly 110. The fixing tape 240 may include a main body unit 241 that extends along the lengthwise direction of the first surface 110c of the electrode assembly 110 and bends to be adhered to short side surfaces 110b of the electrode assembly 110. The fixing tape 240 may further include an auxiliary unit 242 that extends from the main body unit 241 to be perpendicular to the main body unit 241 and bends to be adhered to one of long side surfaces 110a of the electrode assembly 110. The fixing tape 240 may have a T-letter shape by the main body unit 241 extending and bent along the lengthwise direction of the first surface 110c of the electrode assembly 110 and the auxiliary unit 242 perpendicularly extending from one side of the main body unit 241. The auxiliary unit 242 may extend from one side of the main body unit 241 to a region between the first electrode tab 120 and the second electrode tab 130 and may be bent to be adhered to the one long side surface 110a of the electrode assembly 110. The auxiliary unit 242 may be extend from the main body unit 241 in a direction in which the first electrode tab 120 and the second electrode tab 130 are bent.

The fixing tape 240 may be adhered to the first surface 110c of the electrode assembly 110 and may be bent to be adhered to the opposite short side surfaces 110b and the long side surfaces 110a as well, thereby tightly fixing the first electrode tab 120 and the second electrode tab 130 to the first surface 110c of the electrode assembly 110.

The fixing tape 240 may be made of a suitable insulating material such as a polyimide tape, as an example.

In a state in which the fixing tape 240 is adhered to one surface of each of the electrode tabs 120 and 130, the fixing tape 240 may be adhered to the first surface 110c of the electrode assembly 110 while bending the electrode tabs 120 and 130 by 90 degrees so as to be parallel with the first surface 110c of the electrode assembly 110. In order to insulate the electrode tabs 120 and 130 from the first surface 110c of the electrode assembly 110, the insulating tape 150 may further be adhered to the other surface of each of the electrode tabs 120 and 130. For example, after the fixing tape 240 is adhered to one surface of each of the electrode tabs 120 and 130 and the electrode tabs 120 and 130 and the insulating tape 150 is adhered to the other surface of each of the electrode tabs 120 and 130, the fixing tape 240 may be adhered to the first surface 110c of the electrode assembly 110 while the electrode tabs 120 and 130 are bent by 90 degrees so as to be parallel with the first surface 110c of the electrode assembly 110. After the fixing tape 240 is adhered to the first surface 110c of the electrode assembly 110, opposite ends of the main body unit 241 may be bent to then be adhered to the opposite short side surfaces 110b of the electrode assembly 110, and the auxiliary unit 242 may be bent to be adhered to the one long side surface 110a.

By way of summation and review, a pouch-type battery generally includes an electrode assembly having a positive electrode and a negative electrode with a separator as an insulator interposed therebetween and a thin, flexible pouch accommodating the electrode assembly. The pouch accommodates the electrode assembly in an inner space provided by welding its edges. A positive electrode tab and a negative electrode tab are electrically connected to the positive and negative electrode plates of the electrode assembly, respectively, and are exposed and protruded to the outside of the pouch.

Embodiments provide a rechargeable battery that can prevent an electrode tab or a fixing tape from being separated or protruded to be shorted from a pouch by bending the electrode tabs at a right angle using the fixing tape to tightly fix the electrode tabs to an electrode assembly.

Embodiments also provide a rechargeable battery that can increase internal space utilization efficiency of the pouch, and can increase the capacity of the electrode assembly accommodated in the pouch by bending the electrode tabs at right angles using the fixing tape to tightly fix the electrode tabs to an electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
   an electrode assembly;
   a pouch accommodating the electrode assembly;
   a first electrode tab electrically connected to the electrode assembly, the first electrode tab including a protruding portion that protrudes outwardly from a first surface of the electrode assembly so as to be exposed to the outside of the pouch and a parallel portion that extends along the first surface of the electrode assembly; and a fixing tape that attaches and fixes the first electrode tab to the first surface of the electrode assembly, wherein the fixing tape adheres to cover the parallel portion of the first electrode tab bent along the first surface of the electrode assembly and the first surface of the electrode assembly.

2. The rechargeable battery as claimed in claim 1, wherein the first electrode tab includes a first base member tab connected to the electrode assembly, a first external tab having an external tab welding part welded to the first base member tab, and an external tab extension part extending from the external tab welding part and exposed to the outside of the pouch.

3. The rechargeable battery as claimed in claim 2, wherein a thickness of the first base member tab is less than that of the first external tab.

4. The rechargeable battery as claimed in claim 3, wherein:
the thickness of the first base member tab is in a range of 20 μm to 40 μm, and
the thickness of the first external tab is in a range of 0.1 mm to 0.2 mm.

5. The rechargeable battery as claimed in claim 2, wherein the first base member tab is an extension of a first electrode uncoated portion, the first electrode uncoated portion being a portion of a first electrode plate of the electrode assembly where an active material is absent.

6. The rechargeable battery as claimed in claim 2, wherein:
the first base member tab includes a connecting part, a base member tab bending part, and a base member welding part,
the connecting part is connected to the electrode assembly,
the base member welding part is parallel with the first surface of the electrode assembly, the first base member tab being welded to the external tab welding part of the first external tab at the first base member welding part such that the base member welding part and the external tab welding part form the parallel portion of the first electrode tab, and
the base member tab bending part is between the connecting part and the base member welding part.

7. The rechargeable battery as claimed in claim 6, wherein:
the first external tab includes the external tab bending part between the external tab welding part parallel to the first surface of the electrode assembly, and the external tab extension part perpendicular to the first surface of the electrode assembly.

8. The rechargeable battery as claimed in claim 1, further comprising an insulating tape between the parallel portion of the first electrode tab bent along the first surface of the electrode assembly and the first surface of the electrode assembly.

9. The rechargeable battery as claimed in claim 8, wherein a length of the insulating tape in a lengthwise direction of the first surface of the electrode assembly is less than a length of the fixing tape in the lengthwise direction.

10. The rechargeable battery as claimed in claim 1, wherein the fixing tape is adhered in a lengthwise direction of the first surface of the electrode assembly so as to cover the first electrode tab and extends and bends in the lengthwise direction of the first surface of the electrode assembly so as to cover portions of opposite short side surfaces of the electrode assembly.

11. The rechargeable battery as claimed in claim 1, wherein the fixing tape is adhered in a lengthwise direction of the first surface of the electrode assembly so as to cover the first electrode tab and extends and bends to be perpendicular to the lengthwise direction of the first surface of the electrode assembly so as to cover a portion of one long side surface of the electrode assembly.

* * * * *